No. 743,810. Patented November 10, 1903.

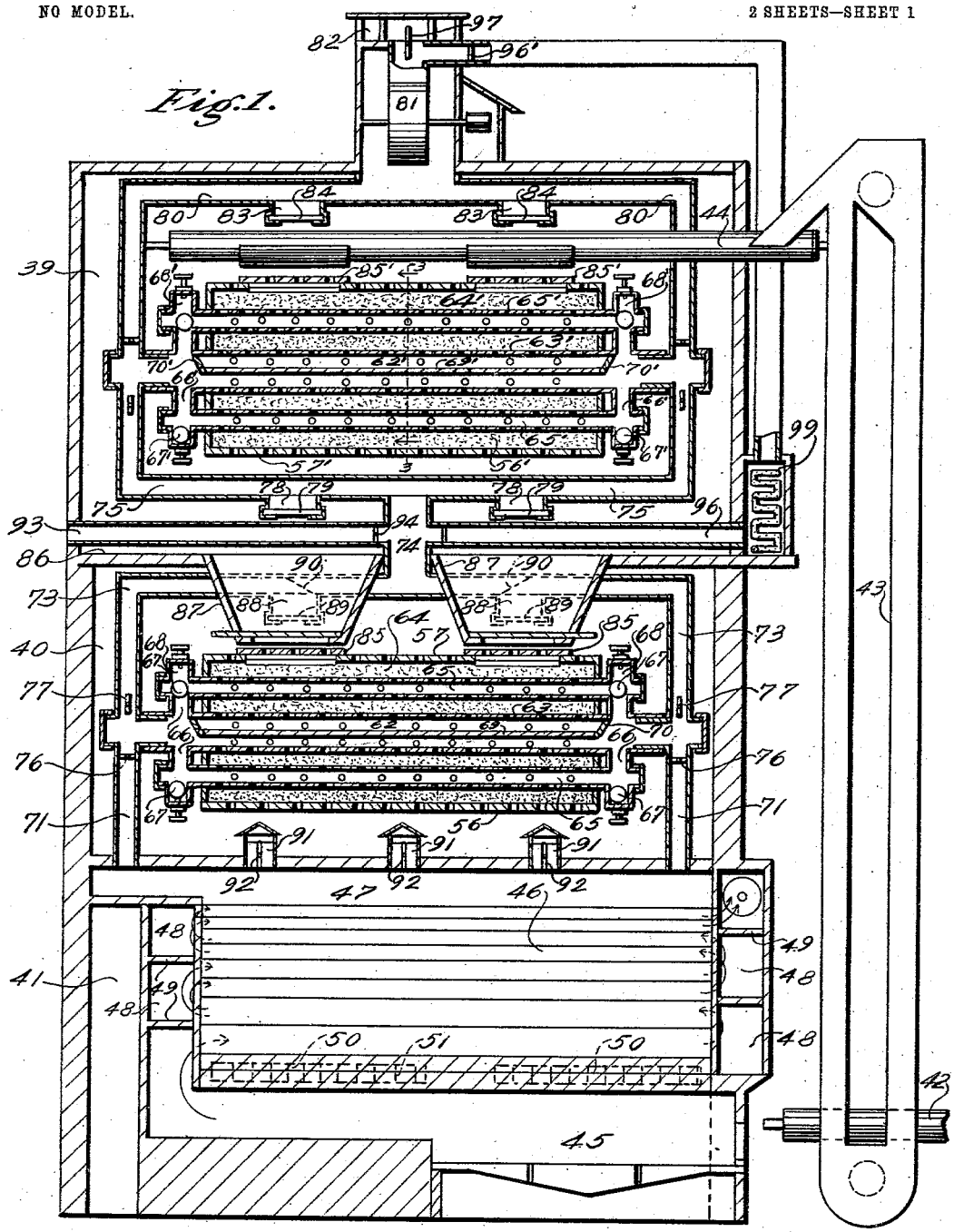

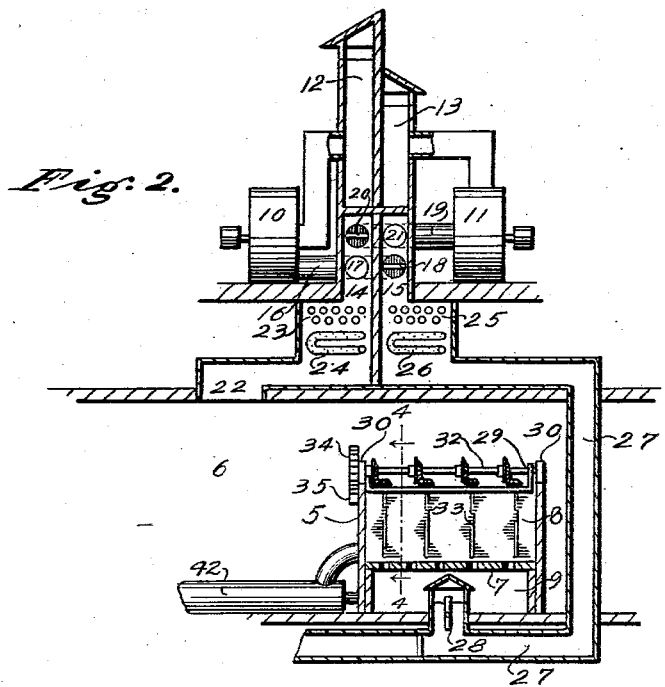
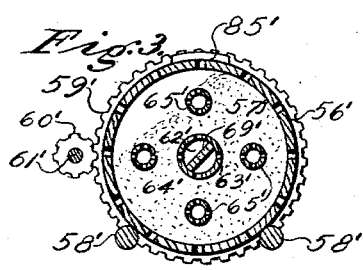
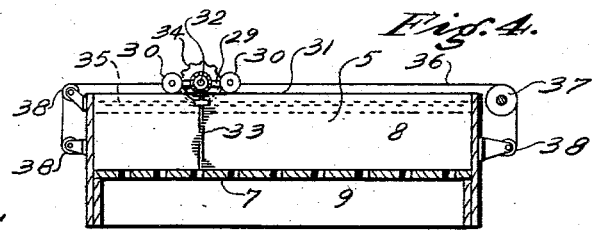

UNITED STATES PATENT OFFICE.

BERNARD BERG, OF CHICAGO, ILLINOIS.

MALTING PROCESS.

SPECIFICATION forming part of Letters Patent No. 743,810, dated November 10, 1903.

Application filed October 29, 1902. Serial No. 129,223. (No specimens.)

*To all whom it may concern:*

Be it known that I, BERNARD BERG, a citizen of the United States of America, and a resident of Chicago, in the county of Cook and State of Illinois, have invented certain new and useful Improvements in Malting Processes, of which the following is a specification.

The main objects of my invention are to provide an improved method for the treatment of grain during the production of malt, whereby all particles of the grain are uniformly treated, and whereby the formation of insoluble malt, known as "glass malt," is avoided, and to produce a form of malt having certain peculiarities of flavor and having its starchy constituents transformed into readily-soluble sugar and dextrine. I accomplish these objects by the methods hereinafter described, and which I put into practice by means of the device shown in the accompanying drawings, in which—

Figure 1 is a vertical section of the withering and drying departments of a malting apparatus constructed according to my invention. Fig. 2 is a vertical section of the germinating apparatus, which forms a continuation of the apparatus shown in Fig. 1. Fig. 3 is a transverse section of the withering-drum on the line 3 3 of Fig. 1. Fig. 4 is a vertical section of the germinating-receptacle on the line 4 4 of Fig. 2.

The device shown in the drawings consists of three receptacles, each particularly adapted for one of the processes of germination, withering, and drying. Said receptacles are each inclosed in separate chambers and are connected with each other by means of conveyers, air-passages, and suitable operating mechanism, hereinafter described.

The germinating apparatus consists of a rectangular receptacle 5, which is open at the top and which is inclosed in an air-tight room or chamber 6. The receptacle 5 is provided with a perforated false bottom 7, which divides same into an upper part 8 for receiving the grain to be treated, and a lower part 9, which communicates with the compartment 6 only through the perforations in the false bottom 7. A pair of fans 10 and 11 are located in the building above the compartment 6 and connect, respectively, by the flues 12 and 13 with the air above the building. The fan 10 is suitably connected to draw air into the building through the flue 12, and the fan 11 is connected so as to expel air from within the building through the flue 13. Two adjacent air-passages 14 and 15 extend upwardly from the compartment 6.

The fan 10 is connected at its delivery end with both of the air-passages 14 and 15 by means of the passage 16, and its communication with the passages 14 and 15 is controlled by the valves 17 and 18, respectively. The valves 17 and 18 are suitably connected together, so that one of same will always be closed when the other is open, and vice versa. Similarly, the passages 14 and 15 are connected with the intake end of the fan 11 by the passage 19 and the valves 20 and 21. The valves 20 and 21 are connected together similarly to the valves 17 and 18. The passage 14 communicates with the compartment 6 at 22 and passes through a suitable heating device 23 and a spraying device 24, where moisture may be added to the heated air. Similarly, the passage 15 is provided with a heating device 25 and a spraying device 26, and communicates by means of the passage 27 with the space 9 of the germinating-receptacle. Communication between the space 9 and the air-passage 27 is controlled by means of a gate 28.

The receptacle 5 is open at the top and is provided with stirring apparatus, which consists of a carriage 29, mounted on wheels 30 on the upper edge 31 of the receptacle 5. Journaled on the carriage 29 is a horizontal shaft 32, which connects by means of bevel-gears to a plurality of vertical shafts 33, which are also journaled in the carriage 29. The shafts 33 are each provided with a series of projecting teeth arranged in the form of a spiral around said shafts. The shaft 32 is driven by a gear 34, which meshes with a rack 35, extending along one side of the receptacle 5. The carriage is drawn along the receptacle 5 by means of a cord 36, which passes around a drum 37 and a plurality of idlers 38 and has its ends connected to opposite ends of the carriage 29. The drum 37 is revolved by driving mechanism (not shown in the drawings) and may be provided with reversing mechanism to change the direction of the movement of the carriage 29 when said carriage approaches either end of the receptacle 5.

The withering and drying department consists of three superimposed compartments 39, 40, and 41, the uppermost of which is in communication with the germinating-compartment 6 by means of the conveyers 42, 43, and 44. The compartment 41 contains a furnace 45 and a plurality of flues 46, which are surrounded by an air-space 47, thus forming an air-heater. The spaces 48 at the ends of the flues 46 are subdivided by baffle-plates 49, which cause the hot gases from the furnace 45 to pass through the flues 46 in the manner indicated by the small arrows at the ends of said flues before escaping. The space 47 communicates with the outer atmosphere by means of a plurality of openings 50, which are controlled by suitable shutters 51.

The drying apparatus consists of a cylindrical drum 56, having perforated peripheral walls 57, and is disposed with its axis horizontal within the compartment 40. The drum 56 rests upon rollers 58 and is provided with annular gears 59, which mesh with pinions 60, which are mounted on the shaft 61 and driven by suitable mechanism. (Not shown in the drawings.) The interior of the drum 56 is subdivided by means of a central air-passage 62, having perforated cylindrical walls 63. The space 64 within the drum and surrounding the air-passage 62 is further subdivided by means of cylindrical air-passages 65, which extend in parallel relation to the axis of the cylinder 56 and also have perforated walls. The passages 65 communicate at each end with the central passage 62 by means of radial passages 66. A ball-valve 67 is seated in each of the passages 66 and is adapted to close said passage when its respective tube 65 is in a position above the axis of the drum 56. Each of the passages 66 communicates with a pocket 68, into which the ball 67 will fall when the tube 65 is below the axis of the drum 56. The opening of the valve 67 is adjustably controlled by a screw 95. The air-passage 62 is preferably subdivided by a longitudinal partition 69, to each end of which is hinged a semicircular valve 70, by means of which the admission of air to either of the subdivisions of the passage 62 may be regulated. The central passage 62 communicates at its ends with the air-passages 71, which connect to the air-space 47 around the heating-pipes 46. The ends of the passage 62 also communicate by the passages 73, which join at 74 and again divide into separate passages 75, communicating with the ends of the central air-passages 62' of the withering-drum 56', which is exactly similar to the drum 56 and which is similarly mounted in the compartment 39.

The various parts of the drum 56' are indicated by reference-numerals similar to those in the drum 56 and distinguished by accent-marks. The valves 76 control the communication between the air-passage 62 and the conduits 71. Similarly, the valve 77 controls the communication between the air-passage 62 and the conduit 73. The air-conduit 75 communicates with the compartment 39 by means of apertures 78, controlled by slide-valves 79. Air-conduits 80 connect the ends of the air-passage 62 with a fan 81, which discharges at 82 at the top of the building. The conduits 80 also communicate with the interior of the compartment 39 by the apertures 83, controlled by slide-valves 84. The drums 56 and 56' are provided with sliding doors 85 and 85', through which grain may be delivered to or discharged from said drums. The floor 86, which separates the compartments 40 and 39, is provided with suitable hoppers 87 for delivering grain from the drum 56' to the drum 56.

The air-passages 73 communicate with the space 40 by means of apertures 88, controlled by slides 89. Inclined screens 90 extend across the passages 73 above the apertures 88. The compartment 40 communicates with the space 47 by means of air-passages 91, which are controlled by valves 92.

The passage 74 is connected with the outer air by means of a passage 93, which is controlled by a slide-valve 94. The passage 74 also communicates, by means of an air-passage 96, with the delivery end of the fan 81, where the valves 96' and 97 are provided, so that air which is drawn from the chamber 39 by the fan 81 may either pass directly into the outer air through the valve 97 or may be caused to pass through the air-passage 95 and back to the passage 74 by closing the valve 97 and opening the valves 96' and 98. A heating and spraying device 99 is provided in the air-passage 96 for supplying additional heat or moisture to the air passing through same. This is controlled by suitable valves, (not shown,) so that the quantity of moisture supplied may be accurately regulated.

The operation of the device shown and the method of treating the grain in putting my invention into practice are as follows: The grain after having been properly steeped in cold water, usually thirty to forty hours, is delivered to the germinating-receptacle 5, where it receives the following treatment: Assume that the valves 20 and 18 are open, that the valves 17 and 21 are closed, as shown in Fig. 2, and that the fans 10 and 11 are being driven by suitable power. Air will be drawn in at 12 by the fan 10 and will be delivered through the pipe 16 to the passage 27. This air will be heated by the heater 25 and will be moistened by the spraying device 26 and will then pass through the air-passages 27 and upward through the perforated bottom 7 of the receptacle 5, where it will pass through the mass of grain in said receptacle and into the compartment 6, from which it will finally be drawn by the fan 11. The grain within the receptacle 5 is gently stirred at suitable intervals by moving the carriage 29 along the top of the receptacle 5. The moist air being delivered through the bottom 7 will give up a great deal of its moisture during its passage through the grain in the receptacle 5, the grain at the bottom of said receptacle being considerably more affected by the air and moisture than that which is near the top. To equalize this effect, the valves 17, 18, 20, and 21 are reversed, so that the fan 10 will deliver air through the passage 22 to the compartment 6 and the fan 11 will exhaust the air through the passage 27, thus causing the current of air to flow in the opposite direction through the grain and tending to cause all of said grain to sprout equally. The direction of the flow of the air is reversed in this manner every four to six hours, and the germinating usually lasts from six to twelve days. During this process the temperature of the air delivered to the grain is maintained at from 12° to 16° centigrade. When the grain in the receptacle 5 has sprouted to a sufficient degree, as determined by the experience of the operator—say about two-thirds the length of the kernel—it is delivered, by means of the conveyers 42, 43, and 44, to the drum 56' and later to the drum 56. The drums 56 and 56' are usually filled to the depth indicated in Fig. 2, so that the particles of grain will tend to roll over each other and be thus turned during the revolution of said drums. The upper surface of the grain will usually stand at about the angle shown, which corresponds to the angle of rest of such granular matter.

Assume that the various valves are disposed as indicated in Fig. 1 and that the fan 81 is in operation. Heated air from the heater in the compartment 41 will pass upward into the compartment 40 and will then pass inward through the perforated walls of the drum 56, through the mass of the grain in said drum and into the air-passage 62 and 65, thence through the air-conduits 73, 74, and 75 into the air-passages 62' and 65', thence through the mass of the grain in the drum 56', through the perforated walls of said drum into the compartment 39 and outward through the apertures 83, thence to the fan 81 and out of the building. The drums 56 and 57 are caused to revolve slowly at certain intervals. In order to equalize the effect of these currents of heated air upon all the grain, the direction of flow of said air through the compartments is reversed by closing the valves 84, 76', 77, and 92 and by opening the valves 77', 79, 89, and 76. The heated air will now pass from the heater through the conduits 71 into the interior of the drum 56, radially outward through the drum into the compartment 40, then through the openings 88 into the passage 74, then through the openings 78 into the compartment 39, through the walls of the drum 56', and, finally, outward through the air-passages 65', 62, and 80 to the fan 81.

During the foregoing operations the temperature of the compartment 40 is kept between 80° and 90° centigrade, which is sufficiently high to dry the grain. Variations of temperature are controlled by regulating the admission of cold air through the openings 51 to the air-space 47 of the heater. During the drying the direction of the flow of air is changed every four to six hours. Drying usually requires eighteen to twenty-four hours. The air enters the compartment 39 at a temperature of about 35° centigrade, which is suitable for withering the sprouted grain preparatory to drying same. This temperature is considerably below that of the compartment 40 and is regulated by admitting cold air through the air-inlet 93. It will be seen that the cold air enters the passage 74, which is the only air-passage connecting the compartments 39 and 40, and therefore regulates the temperature of the air in the compartment 39 regardless of the direction in which the air-currents are flowing through the drums 56 and 56'. When the process is carried on in this manner, the resulting malt after its arrival from the drying-department is the same as that produced by ordinary methods, except that all particles of it are substantially uniform in size, color, and quality. The reciprocating flow of the air through the mass of the grain during each of the stages described has uniformly affected each particle of same and supplied the particles with substantially the same amount of heat and moisture. The gentle stirring which is produced by the stirring device during the process of germination prevents the grain from growing into compact masses, and thus shutting off the flow of air from certain parts of same.

The violent turning of the grain, which is necessary in the older processes in attempts to produce a uniform quality of malt, causes many of the sprouts to be broken off, and the grain thus broken ceases to grow and soon becomes moldy. This seriously affects the flavor of the product. By the process which is herein described the agitation of the grain is so gentle and the treatment of all particles is so uniform that the germinating grain cannot become moldy. During the process of germination the albumen in the grain is transformed into diastase.

During the withering process the heated air is obtained from the drying-room and is reduced to the proper temperature (about 35° centigrade) by the admission of fresh air through the valve 94. The heated air in passing through the grain serves to gradually remove the moisture from the malt, and thus gradually withers the grain. The addition of cold air at this stage is of importance, since the temperature of the air from the drying-room is much too high for use in the withering process. Excessive heat of the withering-air causes the malt to become hard and brittle, forming what is commonly called "glass-malt," which is inferior in quality and has its starchy constituents in a form which is practically insoluble in water. During the withering process the direction of flow of air is changed about every six to eight hours. The withering lasts from eighteen to twenty-four hours.

A superior quality of malt ("sugar-malt") is produced if immediately before withering same the temperature is changed by successive steps while the quantity of moisture in the grain is kept the same, as will be hereinafter described. This is best accomplished in the withering-department.

In order to keep the moisture constant in the grain during the changes of the temperature of the sugaring process, the same air may be caused to circulate through the grain a number of different times. This is effected by closing the valve 97 and opening the valves 96 and 98. This will cause the air after leaving the fan 81 to return by the passage 96 and then flow through the grain, as before. The spraying device 99 serves to supply sufficient additional moisture to the air so that the grain may undergo the desired changes in temperature without losing any of its moisture. During this stage of the sugar-malt process the temperature of the air entering the withering-department is started at about 38° centigrade and is gradually raised to 50° centigrade. This stage lasts from one to three hours. This gradual rise of temperature causes albumen which is contained in the grain to become transformed into diastase. The temperature is next as rapidly as possible raised from 50° to 62° centigrade, and finally the temperature is slowly raised from 62° to 72° centigrade during from one to three hours. At the temperature of from 50° to 62° centigrade the diastase in the grain tends to turn the starch in the grain into sugar. The rapid raising of the temperature at this stage is for the purpose of preventing this change at this time, while the slow change in temperature from 62° to 72° centigrade causes the starch to transform into sugar and dextrine in desirable proportions of each. The grain is now withered and dried, as has been hereinbefore described. The changing currents of air make it possible to dry the grain uniformly, and the drying is continued until all of the moisture in the grain, with the exception of about two or three per cent. of the original quantity, is removed. The reversing air-currents again insure the uniformity of the particles of malt in size, color, and quality. This sugar-malt has the property of rapidly giving up its soluble constituents in the mash-tub and produces a wort which is strong in extract, clear, and of fine flavor and which gives to the beer a certain aroma, such as has heretofore been obtained only by aging. The solubility of the saccharine constituents of this malt makes it possible to commence the extracting in the mash-tub at a much higher temperature than has been practicable heretofore, and thus saves considerable expense. Further steeping at this point is rendered unnecessary, and all of the extract which would be lost by steeping in preparing certain grades of malt is saved by my process. By this process all of the starch in the grain is changed to sugar and dextrine in the green malt previous to withering and drying, and the necessity of causing these changes after the grain is in the mash-tub is thus avoided. Only about half of the usual cooking is necessary to obtain the extract from my new malt.

What I claim as my invention, and desire to secure by Letters Patent, is—

1. The process of malting grain, which consists in steeping same; then causing currents of moist air to flow through the mass of the grain, and reversing said currents in direction at intervals until the grain has sprouted to the desired extent; then causing currents of air to flow through the grain, said currents being reversed in direction at intervals, and increased in temperature first gradually to permit the formation of diastase, then rapidly increased in temperature to prevent the formation of sugar at this stage, then gradually increased in temperature to cause the starch in the grain to be transformed into both sugar and dextrine; then causing currents of dry hot air to flow through the mass of the grain, and reversing said currents in direction at intervals, until the grain has become sufficiently dry, substantially as described.

2. The process of malting grain, which consists in steeping same; then causing currents of moist air to flow through the mass of the grain, agitating the grain, and reversing said currents in direction at intervals until the grain has sprouted to the desired extent; then causing currents of air to flow through the grain, said currents being reversed in direction at intervals, and increased in temperature first gradually to permit the formation of diastase, then rapidly increased in temperature to prevent the formation of sugar at this stage, then gradually increased in temperature to cause the starch in the grain to be transformed into both sugar and dextrine; then causing currents of dry hot air to flow through the mass of the grain, agitating the grain, and reversing said currents in direction at intervals, until the grain has become sufficiently dry, substantially as described.

3. The process of malting grain, which consists in steeping same; then causing currents of moist air at from about 12° to 16° centigrade to flow through the mass of the grain, agitating the grain, and reversing said currents in direction at intervals during a period of from six to twelve days, whereby the grain is caused to sprout; then, while supplying sufficient moisture to compensate for evaporation, causing currents of air to flow through the grain, said currents being reversed in direction at intervals, and being increased in temperature first gradually from about 38° to 50° centigrade during a period of about one to three hours, to permit the formation of disastase, then rapidly increased to about 62° centigrade, to prevent the formation of sugar at this stage, then gradually increased during a period of from about one to three hours, to about 72° centigrade, to permit the starch in the grain to be transformed into both sugar and dextrine; then causing currents of dry air at from about 35° to 90° centigrade to flow through the mass of the grain, agitating the grain, and reversing said currents in direction at intervals, until the grain has become sufficiently dry, substantially as described.

4. The process of malting grain which consists in steeping and germinating the grain; then, while supplying sufficient moisture to compensate for evaporation, causing currents of moistened air to flow through the mass of the grain, and reversing the direction of said flow at intervals, said currents of air commencing at a temperature of about 38° centigrade and gradually rising in temperature during from about one to three hours to about 50° centigrade, then rising rapidly to about 62° centigrade, then gradually rising during from one to three hours to about 72° centigrade; and then causing currents of dry hot air to pass through the mass of the grain, and reversing the direction of such flow at intervals, substantially as described.

5. The process of malting grain which consists in steeping and germinating the grain; then, while supplying sufficient moisture to compensate for evaporation, causing currents of moistened air to flow through the mass of the grain, and reversing the direction of said flow at intervals, said currents of air commencing at a temperature of about 38° centigrade and gradually rising in temperature during from about one to three hours to about 50° centigrade, then rising rapidly to about 62° centigrade, then gradually rising during from one to three hours to about 72° centigrade; and then causing currents of dry hot air to pass through the mass of the grain, agitating the grain, and reversing the direction of such flow at intervals, substantially as described.

6. The process of malting grain, which consists in steeping the grain; then submitting same to heat and moisture until it has sprouted to the desired extent; then heating same in moist air starting at about 38° centigrade and raising the temperature first gradually to 50° centigrade; then quickly from 50° to 62° centigrade, then slowly again from about 62° to 72°; and finally drying same in air heated to about 80° or 90° centigrade, substantially as described.

7. The process of malting grain, which consists in steeping the grain; then submitting same to heat and moisture until it has sprouted to the desired extent; then heating same in moist air starting at about 38° centigrade and raising the temperature first gradually to 50° centigrade, then quickly from 50° to 62° centigrade, then slowly again from about 62° to 72°; then withering the grain in dry air at about 35° centigrade, and finally drying same in air heated to about 80° or 90° centigrade, substantially as described.

8. The process of malting grain, which consists in steeping the grain; then submitting same to heat and moisture until it has sprouted to the desired extent; then heating same in moist air starting at about 38° centigrade and raising the temperature first gradually to 50° centigrade, then quickly from 50° to 62° centigrade, then slowly again from about 62° to 72°; then withering and drying same in hot dry air, substantially as described.

Signed at Chicago this 27th day of October, 1902.

BERNARD BERG.

Witnesses:
EUGENE A. RUMMLER,
RUDOW RUMMLER.